United States Patent [19]

Hickling

[11] Patent Number: 4,556,020
[45] Date of Patent: Dec. 3, 1985

[54] METHOD AND MEANS FOR STIMULATING COMBUSTION ESPECIALLY OF LEAN MIXTURES IN INTERNAL COMBUSTION ENGINES

[75] Inventor: Robert Hickling, Huntington Woods, Mich.

[73] Assignee: General Motors Corporation, Detroit, Mich.

[21] Appl. No.: 280,897

[22] Filed: Jul. 6, 1981

[51] Int. Cl.[4] .............................. F23H 5/26; F23N 5/20
[52] U.S. Cl. .................................. 123/143 B; 123/536; 431/6
[58] Field of Search .............. 123/536, 537, 538, 539, 123/143 B; 60/39.06, 39.82 R, 274; 313/110; 431/6; 250/435

[56] References Cited

U.S. PATENT DOCUMENTS

| 3,473,879 | 10/1969 | Berberich | 123/143 B |
| 3,934,566 | 1/1976 | Ward | 123/536 |
| 4,034,557 | 7/1977 | Cerkanowicz | 123/536 |
| 4,035,131 | 7/1977 | Cerkanowicz | 123/536 |
| 4,043,308 | 8/1977 | Cerkanowicz | 123/143 R |
| 4,052,139 | 10/1977 | Paillaud et al. | 123/536 |
| 4,134,530 | 2/1982 | Giacchetti | 123/143 B |
| 4,230,448 | 10/1980 | Ward et al. | 123/536 |

FOREIGN PATENT DOCUMENTS

| 1253874 | 1/1961 | France | 123/536 |
| 745671 | 1/1965 | France | 123/536 |

Primary Examiner—Raymond A. Nelli
Attorney, Agent, or Firm—Robert J. Outland

[57] ABSTRACT

Method and means are disclosed for stimulating combustion especially of lean mixtures in internal combustion engines. For example, an ultraviolet lamp mounted in the combustion chamber of an engine directs radiation of wavelength exceeding 190 nm on the advancing flame front. The radiation largely passes through the cool unburned mixture and is absorbed in disassociating oxygen molecules in the flame front thereby stimulating combustion of the flame and allowing the burning of exceptionally lean air-fuel mixtures. Numerous features and alternative embodiments are disclosed.

3 Claims, 11 Drawing Figures

METHOD AND MEANS FOR STIMULATING COMBUSTION ESPECIALLY OF LEAN MIXTURES IN INTERNAL COMBUSTION ENGINES

TECHNICAL FIELD

This invention relates to the stimulation of combustion by ultraviolet radiation. In another aspect, the invention relates to radiation assisted combustion of lean mixtures in internal combustion engines. In a more particular aspect, the invention involves selective wavelength ultraviolet radiation of turbulent lean mixtures under pressure to promote their combustion in separate ignition type internal combustion engines.

BACKGROUND

It is well known that spark ignition engines are generally less efficient (about 15 to 25% less) than compression ignition or diesel engines. This is because compression ignition engines operate with an unthrottled air intake, with very lean air-fuel mixtures and at higher compression ratios. Spark ignition engines generally are not made to operate in this way because combustion with spark ignition fuels (i.e., fuels with low cetane numbers) cannot be sustained in very lean, homogeneous air-fuel mixtures. Nonhomogeneous air-fuel mixtures (otherwise known as stratified charge) have been used to operate with very lean overall mixtures but, in spite of many years of effort, only limited commercial success has been achieved with this approach. To achieve higher engine efficiency with low cetane fuels is an important objective since it could provide an alternative to the use of diesel engines in passenger cars and light vehicles and have major implications for the future in the use of fuels such as methanol and ethanol derived from coal and biomass because such fuels are low-cetane fuels.

Another approach to achieving unthrottled, lean-mixture operation in spark ignition engines is to use some form of electromagnetic radiation to stimulate combustion in the cylinders. In this way flames may be made to travel through very lean mixtures and consume the fuel in the way they do with conventional, near stoichiometric combustion. Radiation assisted combustion could also reduce exhaust emissions; inherently, lean mixture operation can reduce oxides of nitrogen and carbon monoxide and stimulation of combustion by means of radiation in the thermal quench layer on the walls of the combustion chamber could also reduce hydrocarbon emissions.

Radiation assisted combustion could also be important in compression ignition engines in helping to reduce particulates or soot and in facilitating the use of lower grade fuels. It might also have an application for nonautomotive power plants and in some forms of chemical processing. The principal application to be considered here, however, is the unthrottled lean mixture operation of spark ignition engines.

Although not necessarily aimed at unthrottled, lean mixture operation of spark ignition engines, several methods have previously been proposed of using radiation to promote combustion. The types of radiation that have been considered extend over the range of electromagnetic radiation. They include:
(a) Electric fields and microwaves
(b) Visible and near visible light including lasers
(c) Ultraviolet light
(d) Nuclear radiation.

Viewed in a practical light, some of these methods present substantial difficulties. The use of nuclear radiation would appear to involve substantial safety questions. The concept of electric fields has not so far been demonstrated to be beneficial in engines. Laser sparks appear to be of little value because of the impracticality of using a laser system in a vehicle; also, although laser sparks can ignite lean mixtures, the use of laser light to increase flame speeds would require excessively large amounts of electrical power. In general, light sources in the visible and near visible range can only stimulate combustion by heating the gases in the flame and it is indicated that stimulating combustion by thermal means requires too much power in relation to the additional engine power that could be gained by unthrottled lean mixture operation.

The microwave approach appears easiest to implement with current technology. However, there are inherent difficulties with the use of microwaves. It has been shown that the input impedance of microwaves in a flame loaded, combustion chamber resonance system is significantly affected by the shape and location of the flame in the combustion chamber cavity. Because of turbulence and random motions of a typical flame in an engine cylinder, it would be difficult to keep the microwaves continuously coupled to the flame. Another problem is that the tangential component of the electric field generated by the microwave resonance dies out near the electrically conducting walls of a combustion chamber. Since it appears to be this component that drives the flame, it would seem that the flame would quench itself before it could reach the walls, thereby increasing emissions and reducing engine efficiency. Another difficulty is that turbulence and other gas motions appear to inhibit the transfer of energy from the electrical field to the flame. Because of all these difficulties, microwaves may not be the most effective way to stimulate combustion in spark ignition engines.

Ultraviolet light can stimulate combustion in an entirely different way. This form of radiation is absorbed by the oxygen molecules in the air-fuel mixture which disassociate into oxygen atoms. Oxygen atoms are highly reactive and if present in sufficient quantity will initiate combustion in the mixture. The ability of ultraviolet light to initiate combustion is a well documented effect (see, for example, R. G. W. Norrish, "The Study of Combustion by Photochemical Methods," Tenth Symposium (international) on Combustion, pp. 1-18, The Combustion Institute, 1965 and A. E. Cerkanowicz, "Photochemical Initiation of Sustained Combustion in Unsensitized Gaseous Fuel-Oxygen Mixtures," Ph.D. Dissertation, Stevens Institute of Technology, June 1970).

One proposed extension of this concept, called "preconditioning", is to irradiate the air-fuel mixture with ultraviolet light prior to combustion. Initiation of combustion is then achieved by creating a sufficient concentration of oxygen atoms next to the window of the light source (or by using some other form of ignition). Stimulation of subsequent combustion is purportedly achieved by the oxygen atoms created in the path of the flame by the prior irradiation of the air-fuel mixture with ultraviolet light.

The preconditioning method assumes that the oxygen atoms will stay in existence long enough in the unburned mixture to stimulate the flame as it moves into the unburned mixture. Towards the end of the compression stroke in an internal combustion engine, the air-fuel mixture reaches temperatures of about 600 K and at these temperatures the reaction times of the oxygen atoms are very short, of the order of microseconds. It can be questioned, therefore, whether the oxygen atoms created by prior irradiation will remain in existence long enough to stimulate combustion in the flame.

Another drawback of the preconditioning method is that it requires ultraviolet radiation of relatively short wavelengths, roughly in the range from 160 to 200 nm. Presently, there appear to be no reasonably efficient sources of ultraviolet light in this range. Rare gas, electrical discharge lamps have been used experimentally, but only a very small part of the output of these lamps is in the required range. Also exotic materials such as sapphire and lithium fluoride are required for the windows since ordinary quartz or glass generally does not have enough transmissibility in this range of wavelengths.

SUMMARY OF THE INVENTION

My improved method of stimulating combustion overcomes difficulties associated with the previously described methods. It is somewhat similar to microwave stimulation in that it feeds radiant energy directly to the flame and not elsewhere in the air-fuel mixture. Yet it can stimulate combustion all the way to the walls of the combustion chamber and is not adversely affected by turbulence and arbitrary motions of the flame. In fact it benefits from the normally existing turbulent conditions which thicken the flame front and thereby increase the ultraviolet absoption of the flame. It uses ultraviolet (U-V) light but in a way completely different from the preconditioning method. In feeding the photon energy primarily to the flame, it disassociates molecular oxygen to form chemically active oxygen atoms at the appropriate time and place for stimulating chemical reactions in the flame. Also, it uses ultraviolet light of longer wavelengths than the preconditioning method and hence can make more efficient use of ultraviolet sources, and does not require the use of exotic window materials.

An advantage of this improved method is that it supplies to the flame chemically active oxygen atoms which aid directly in the oxidation (i.e., combustion) of the fuel. The method makes use of the fact that there is a large difference between the absorption of molecular oxygen in the high temperature flame and in the unburned cooler mixture ahead of the flame. With ultraviolet radiation in the appropriate range of wavelengths and under the conditions of high pressure and turbulent flow normally existing in an internal combustion engine combustion chamber photon energy can be made to pass through the unburned mixture with negligible absorption but on reaching the flame front it is in large part absorbed by the higher temperature molecular oxygen where it creates oxygen atoms and stimulates combustion. To distinguish it from the preconditioning method, the new method is called the absorption front method.

The possible applications of my improved method are many and are intended to be included within the scope of the invention. However, the primary application of interest is in the stimulation of combustion in so-called spark ignition or separate ignition type internal combustion engines. It is considered that application of my improved method of ultraviolet radiation stimulation to such engines will permit unthrottled operation with much leaner fuel-air mixtures than is possible with other systems with a resultant potential for increased efficiency and reduced emissions of undesirable exhaust gas components. These and other features and advantages of the invention will be more fully understood from the following description of the underlying concepts of the method and of selected specific embodiments taken together with the accompanying drawings.

BRIEF DRAWING DESCRIPTION

UNDERLYING CONCEPTS OF THE METHOD

In the region of the ultraviolet spectrum for wavelengths greater than about 190 nm the absorption of molecular oxygen is strongly dependent on temperature and across the flame front in a spark ignition engine there is typically a temperature difference of the order of 1000 K. With an appropriate choice of wavelengths, this temperature difference can create a difference in the absorption coefficient of molecular oxygen of about two orders of magnitude. In other words, there is an absorption "wall" at the flame front and, under the conditions of pressure and turbulent flow normally existing in a combustion chamber, the ultraviolet light can be made to pass through the unburned portion of the mixture ahead of the flame with negligible absorption until it reaches the flame front where it essentially "piles up" at the absorption wall.

The absorption of ultraviolet light by molecular oxygen is governed by the well known Beer-Lambert exponential attenuation law expressed by the equation $$I_\lambda = I_\lambda^o \exp\left[-\sigma_\lambda n_o \frac{p}{100.13}\left(\frac{273.16}{T}\right)x\right]$$

where
- $T$ is the temperature in degrees Kelvin (K)
- $p$ is the air pressure in kilopascals (kPa)
- $x$ is the distance penetrated by the light in millimeters (mm)
- $n_o$ is the number of gas molecules per mm$^3$ at standard temperature and pressure $=2.69\times10^{16}$ (Loschmidt's number)
- $\sigma_\lambda$ is the absorption cross section in mm$^2$ per atmosphere pressure
- $I_\lambda^o$ is the light energy of wavelength $\lambda$ per unit of area and time at the entry point to the gas, and
- $I_{80}$ is the light energy of wavelength $\lambda$ per unit of area and time at the distance x from the entry point.

Figure 1:
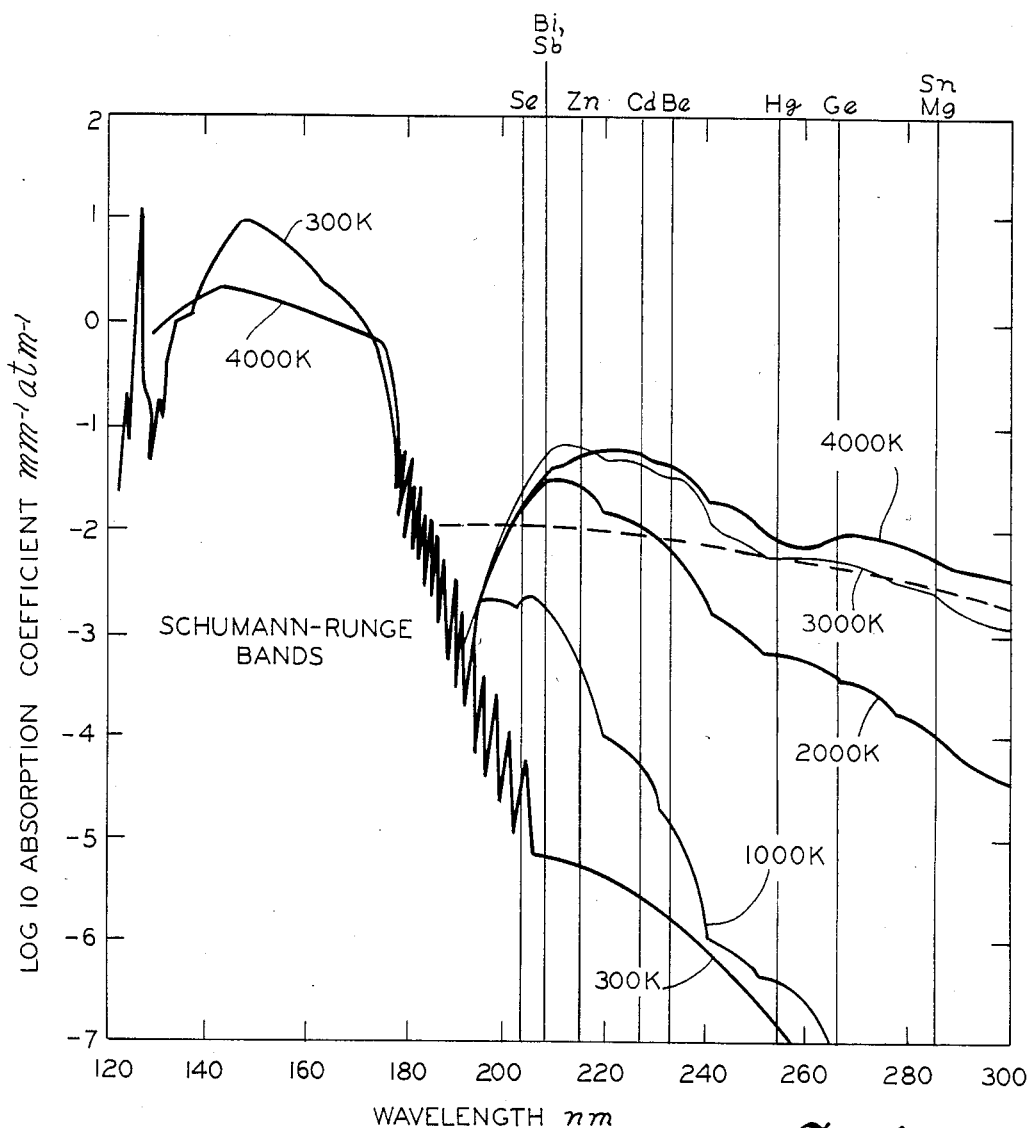
FIG. 1 is a graphical presentation of data indicating the absorption coefficient in the ultraviolet spectrum of wavelengths for air at various temperatures, together with the wavelength emission characteristics of various substances.

The quantity $k_{80} = \sigma_{80} n_o$ is called the absorption coefficient and is expressed in mm$^{-1}$ atmos$^{-1}$. FIG. 1 shows plots of the absorption coefficient $k_\lambda$ as a function of wavelength $\lambda$ in nanometers (nm) at 1 atmosphere pressure and at different temperatures measured in degrees Kelvin (K). This data was obtained from two sources: (a) J. G. Calvert and J. M. Pitts, "Photochemistry, John Wiley and Sons, Inc., 1966; and (b) R. K. M. Landshoff and J. L. Magee (editors), "Thermal Radiation Phenomena," Vol. I, "Tables of Radiation Properties of Air," IFI/Plenum, 1969. Over the range of temperatures shown in the figure, the absorption is roughly proportional to pressure in the range from 1 to 50 atmospheres which is roughly the range of absolute pressure that can occur in an engine cylinder.

During combustion in a spark ignition engine, the combustion chamber volume can be divided into two zones, the unburned zone of the air-fuel mixture and the burned zone. These zones are separated by the flame front which advances from the burned zone into the unburned zone. A typical temperature in the unburned zone is 600 K while in the burned zone and the flame for near stoichiometric combustion, it is about 2700 K. For very lean mixtures, where the amount of air in the mixture might be about two and a half times what it is for near stoichiometric combustion, the flame temperature and the temperature of the burned zone would be about 1500 K. The flame is about 10 to 20 mm thick for a typical turbulent flame in an engine.

Referring to FIG. 1, it is seen that there are major variations in absorption with temperature in the range above about 190 nm and relatively little variation with temperature below 190 nm. Although in the range above 190 nm the data is not detailed enough to give precise values of the absorption coefficients at 600 K and 1500 K, estimates can be made by rough interpolations from this data. It should be noted that the absorption data in FIG. 1 can be explained in terms of energy states of the two atom oxygen molecule.

Figure 2:
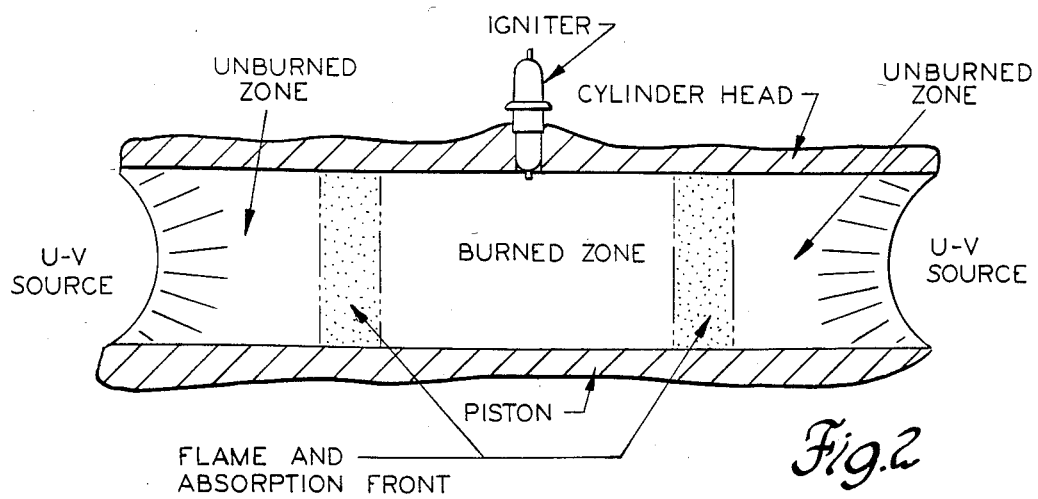
FIG. 2 is a schematic representation of the application of the method of the present invention to an engine combustion chamber.

To illustrate how the absorption front method works in a spark ignition engine the following typical condition will be considered. First assume that flame progresses outwards from the center of a cylinder of radius 50 mm, corresponding to a typical engine cylinder radius, and that the turbulent flame is about 10 to 20 mm thick. Further, assume the flame has already traveled 40 mm from the center of the chamber and has a further 10 mm to go to traverse the remaining unburned mixture, as illustrated schematically in FIG. 2. The pressure at this stage is assumed to be about 40 atmospheres. Very lean combustion is assumed with an air-fuel ratio of about 35. Now consider the absorption at 210 nm in FIG. 1. Interpolating at this wavelength gives an absorption coefficient of about 0.01 at 1500 K and about 0.0001 at 600 K. Using the Beer-Lambert attenuation law previously given, at a pressure of 40 atmospheres, about 2% of the photon energy at the wavelength of 210 nm is lost in passing through 10 mm of the unburned mixture while 50% of the remaining energy is absorbed within 10 mm of the flame.

Suppose next that the flame is at the center of the cylindrical chamber at the start of the combustion and has a radius of about 15 mm while the pressure at this stage is about 10 atmospheres. In this case, the unburned region extends 35 mm from the wall. For the 210 nm wavelength, again only 2% of the photon energy is lost in traversing the 40 mm from the wall to the flame while 42% of the remainder is absorbed within 30 mm of the central core of the flame.

It is apparent that, because of the absorption characteristics of air as a function of temperature and pressure, the conditions in a spark ignition engine combustion chamber are such that U-V radiation within the wavelength range from about 190 nm to 250 nm and beyond will be absorbed by a turbulent flame and produce oxygen atoms to aid in the combustion process without losing excessive photon energy by absorption in traversing the unburned portion of an air-fuel mixture ahead of the flame. It should be noted that the U-V radiation cannot be made to reach the flame from behind because the burned gases behind the flame are generally at a temperature comparable to that of the flame, and hence would absorb the radiation before it reaches the flame. It should be noted also that the absorption front concept is a general one that could also be used in other types of engines and in other applications in addition to that of enhancing combustion in automotive spark ignition engines as described herein.

The absorption front method may be practiced with a variety of possible sources of U-V radiation. FIG. 1 shows the strong emission lines of various chemical elements indicated by solid vertical lines and appropriate chemical symbols, superimposed on the absorption data for air previously discussed. The data on these emission lines was obtained from tables by W. F. Meggers, C. H. Corliss, B. F. Scriber, "Tables of Spectral-Line Intensities, Part II—Arranged by Wavelengths," Institute of Basic Standards, National Bureau of Standards, Second Edition, 1975. In addition to these possible line sources, there are band sources emitting U-V light over a range of wave-lengths. Commonly used sources of this type are rare gases such as xenon and neon. Another possible source is deuterium whose relative spectral output is shown in FIG. 1 by the dashed line. This data on the spectral output of deuterium was obtained from, *Applied Optics*, Vol. 17, No. 4, 1978, pp. 593–600, "Spectral Irradiance Standard for the Ultraviolet: The Deuterium Lamp," by R. D. Saunders, W. R. Ott and J. M. Bridges of the National Bureau of Standards.

Figure 4:
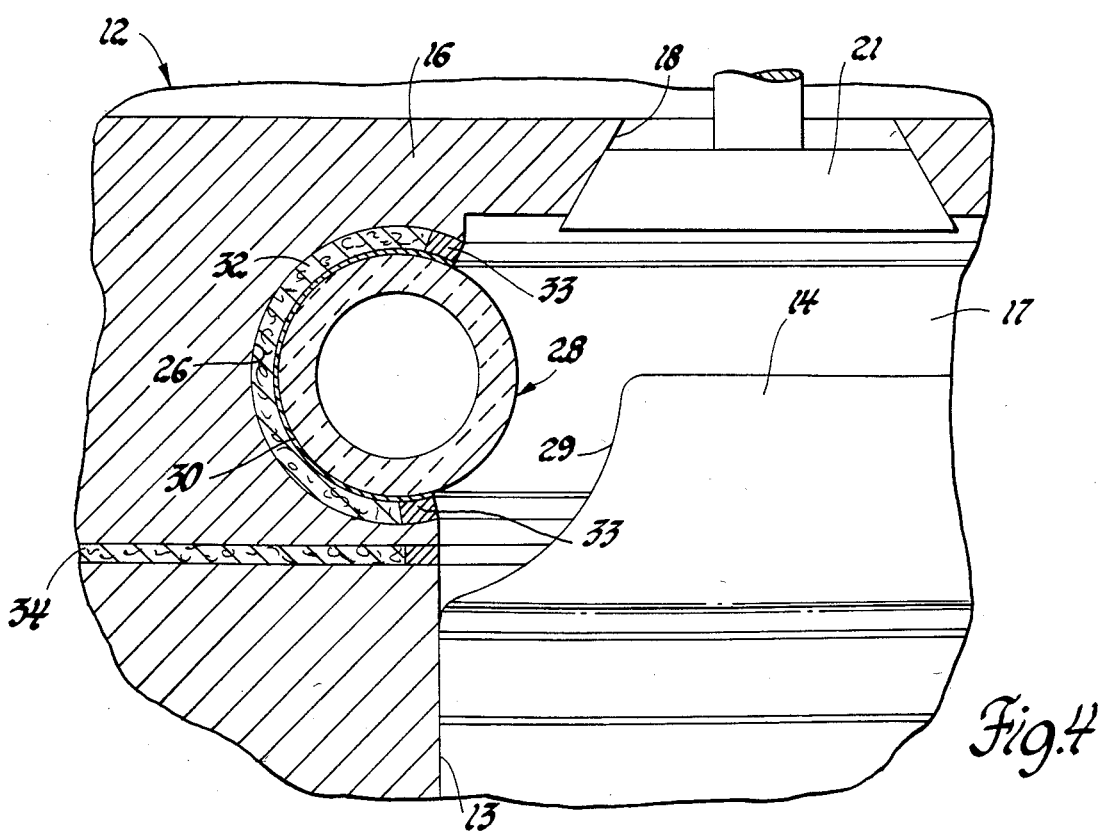
FIG. 4 is an enlarged view of a portion of FIG. 3 showing certain details of the engine and radiation lamp assembly.

Xenon, neon and deuterium lamps with a continuous output and also lamps using the spectral lines of cadmium and zinc are commercially available as U-V sources for spectroscopic experiments. These commercially available lamps have a continuous output, whereas for the present application a flash lamp would be preferred that produces U-V radiation for the duration of the combustion in the combustion chamber and has the U-V radiation shut off for the remainder of the operating cycle of the engine. Flash lamps using deuterium and the emission lines of zinc, cadmium, selenium, etc., as shown in FIG. 4, are not presently available largely because there has been no application for such lamps. However, the technology exists for building such flash lamps for example in the standard text by J. F. Waymouth, "Electric Discharge Lamps," MIT Press, 1971. Laser sources in the U-V might also be considered for the present application, however, the coherent properties of laser light are apparently not needed to stimulate combustion and hence it is probably not worth considering the relatively costly, intricate system of a laser for use in an engine. Another means of generating U-V light in the range of wavelength required for this invention is to use a microwave discharge in the gas used in the lamp such as deuterium or other appropriate gas and some of the chemical additives shown in FIG. 4. An electric discharge system appears simpler however and is probably less costly.

Another consideration is the material of the lamp through which the U-V radiation passes to reach the gas in the combustion chamber. The relatively expensive sapphire or other materials required in the preconditioning method are not required for the absorption front method described here because longer wavelengths are used for the absorption front method. For the present application the cutoff wavelength of the transmitting material of the lamp should be somewhere between 180 and 190 nm. This makes it possible to use cheaper and stronger materials such as quartz which is frequently used as a window material in combustion chambers. A good U-V grade of quartz of 10 mm thickness has approximately 70% transmission at the 185 nm wavelength and a transmissibility greater than 90% for wavelengths longer than 200 nm. This is better than is required for the present application and hence it may be possible to use a cheaper grade of quartz. The thickness of the wall of the lamp would probably be in the range from about 5 to 7 mm.

The discussion of underlying concepts is completed by estimating the power requirements of a lamp in an engine cylinder. It was demonstrated by Cerkanowicz in his Ph.D. thesis dissertation referenced above that about 10 $\mu J/mm^3$ was the ultraviolet photon energy density required to initiate combustion in air-fuel mixtures at normal temperature and pressure when there is sufficient absorption by the oxygen molecules. In this same work it was shown that this quantity increases relatively slowly with gas pressure while for an increase from normal temperature to 1500 K it would be expected to decrease by a large amount, possibly two orders of magnitude. It is assumed, therefore, that the photon energy density required to support a lean flame in an engine is of the order of 1 $\mu J/mm^3$. This estimate is conservative because the photon energy is being used only to support combustion, not initiate it. Suppose then that the flame is 20 mm thick, 10 mm high with an outer radius of 40 mm and therefore with a volume of about 42,000 $mm^3$. This will require about 42 mJ of ultraviolet photon energy to support the flame. Then assume that the flame moves from the center of the cylinder to the cylinder wall during about 40 degrees of crank and that the engine speed is 40 Hz or revolutions per second. The flame therefore moves through 20 mm in about 1.4 ms making the power requirement during this interval of time about 60 W. The volume of the flame increases as it moves outwards from the center of the cylinder so that the power requirement increases correspondingly from about 26 W when the flame is near the center of the cylinder to about 80 W when the flame is at the cylinder wall. During 40 degrees of crank, i.e., during the passage of the flame, the average photon power required is about 30 W and the average power during the 2 cycles of engine operation is therefore about 3.2 W/cylinder. It can be conservatively estimated that the efficiency of a suitable pulsed U-V source in converting electrical energy to radiant energy would be about 3%. This would make the average electrical power requirement about 100 W/cylinder which is small in comparison to the increase in power which open throttle, lean mixture operation could generate in spark ignition engines. As already stated estimates have shown that open throttle, lean mixture operation could increase the efficiency of spark ignition engines by 25%.

BEST MODE DESCRIPTION

Figure 3:
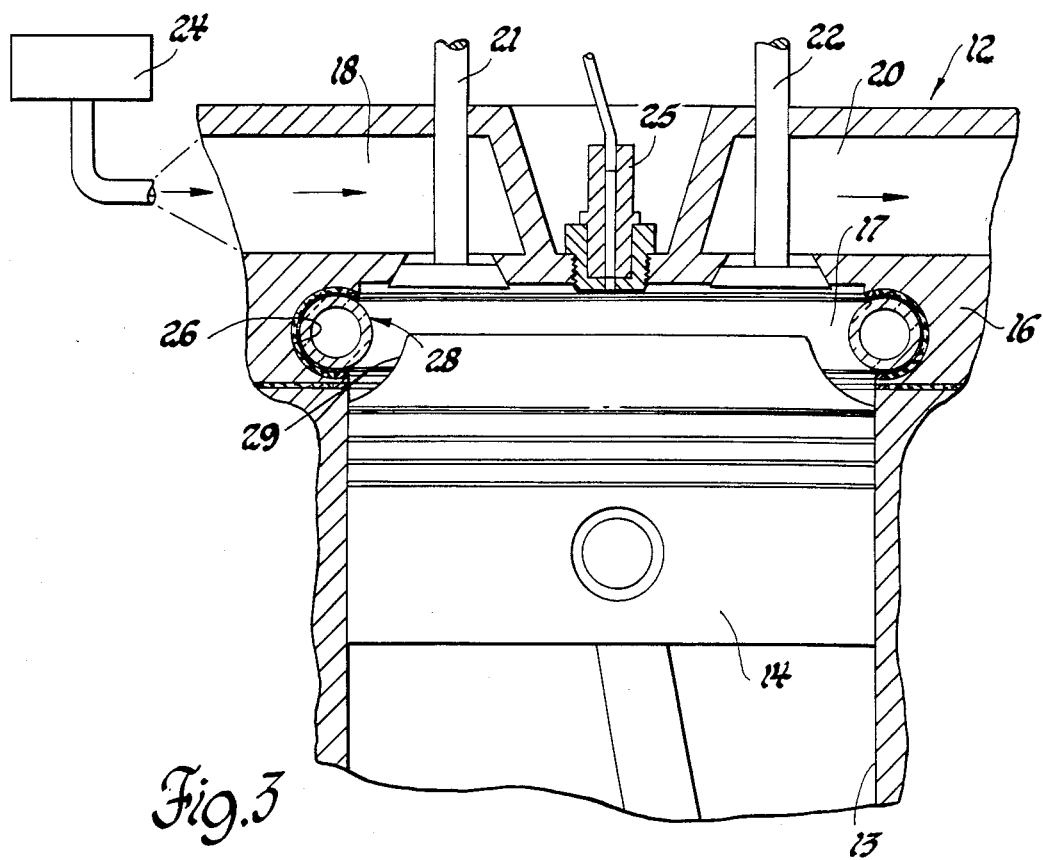
FIG. 3 is a cross-sectional view through a representative engine having combustion stimulation means in accordance with the present invention.

A preferred embodiment of the invention as applied in a separate ignition internal combustion engine is illustrated in FIG. 3 where the engine is generally indicated by numeral 12. Engine 12 includes conventional means defining a cylinder 13 in which a piston 14 is reciprocably disposed. A cylinder head 16 closes the upper end of the cylinder to define at the closed end a combustion chamber 17.

Inlet and exhaust ports 18, 20 respectively are provided in the cylinder head connecting with the combustion chamber, communication being controlled by conventional inlet and exhaust valves 21, 22 respectively. A charge forming device 24, such as a carburetor or fuel injector, is provided to supply a homogeneous fuel-air mixture to the engine inlet port for delivery to the combustion chamber on the intake stroke of the piston.

The engine 12 is further provided with suitable ignition means including a high energy ignition plug such as a plasma jet igniter 25 mounted in a wall of the cylinder head and extending into the center of the preferably circular combustion chamber. Around the periphery of the chamber, the cylinder head defines a toroidal recess 26 in which there is mounted a toroidally shaped ultraviolet radiation lamp 28 having its inner side projecting into the combustion chamber. The outer edges of the piston top are toroidally recessed at 29 to provide clearance around the lamp when the piston reaches its top dead center position.

In operation, a lean homogeneous fuel-air mixture is provided by the charge forming device and drawn into the combustion chamber on the piston intake stroke. The mixture is then compressed and ignited at the center of the combustion chamber by the plasma jet igniter. This device provides a strong high temperature core as required for igniting and developing a flame front in the lean turbulent fuel-air charge in the cylinder.

While the ignition core is being created, the ultraviolet lamp is switched on to irradiate the turbulent flame with ultraviolet light. The wavelength of the emitted light is such that the photon energy is mainly absorbed by the flame and not by the unburned mixture between the lamp and the flame. For this application, an ultraviolet light wavelength primarily exceeding 190 nm is required.

The photon energy absorbed by the flame disassociates oxygen molecules in the flame, stimulating combustion as the flame propagates to the wall. This preferably will occur within about 40° of crank angle rotation wherein the piston will travel downwardly only a small portion of its total travel. The lamp protrudes into the chamber so that the ultraviolet radiation can penetrate both into corners of the cylinder head and into the corner where the piston meets the wall below the lamp. The recessed portion of the piston face is provided to avoid contact with the protruding lamp but, in addition, this curved surface will also reflect the ultraviolet light to aid in the final stages of combustion in this region.

The lamp has to provide photon energy during the time the flame moves out from the central ignition core to the walls of the cylinder so that the duration of the flash must be of the order of several milliseconds. The duration of the flash is preferably timed with the cycling of the engine and the firing of the plasma jet igniter so that it occurs immediately after the firing of the igniter is initiated during a prescribed interval of crank angle during which combustion is occurring in the cylinder. The power output of the lamp may be made to increase during the duration of the flash in order to supply the increased amount of photon energy required to irradiate the flame as the flame front moves outward radially from the ignition core. This increase in the power output of the lamp does not have to be precisely tailored to the minimum needs of the flame so long as the output is sufficient at all stages. The lamp can be activated either by an electrical discharge or by microwaves. The embodiment illustrated here uses an electrical discharge.

FIG. 4 shows how the toroidal lamp 28 made from an appropriate U-V grade of quartz or fused silica can be inserted into an appropriate shape of cavity 26 cast and machined in the engine head. The lamp has a reflecting coating 30 on its outer surface to reflect radiation into the engine cylinder. Between the lamp and the cavity in the engine head there is a resilient gasket 32 which absorbs the pressures on the quartz lamp and prevents the lamp from impacting against the hard surface of the metal cavity wall. The gasket preferably has a tip 33 of copper or other suitable material of the type commonly used with cylinder head gaskets, which provides a seal between the outer edge of the cavity and the quartz lamp. This tip, fitted into the retaining edge of the cavity prevents the lamp from being pulled into the cylinder during the brief periods of low cylinder pressure in the operating cycle of the engine. Another purpose of this tip is to prevent the gasket material from fraying. The gap between the modified engine head and the engine block is sealed by means of a conventional head gasket 34. As indicated earlier the piston face is curved so as to avoid contact with the lamp near top dead center. The lamp protrudes from the wall of the cylinder in order for it to irradiate completely the combusting mixture in the engine cylinder.

Figure 5:
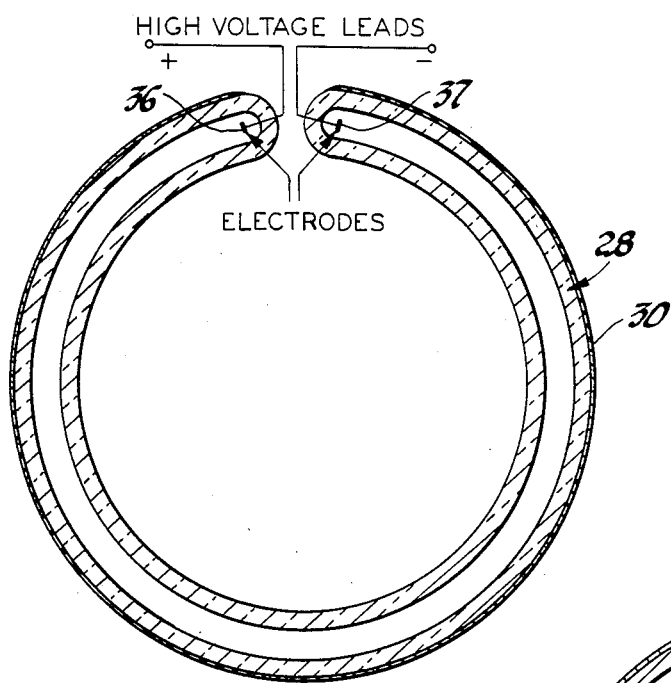
FIG. 5 is a plan view of one form of toroidal lamp suitable for use in an engine according to the invention.
Figure 6:
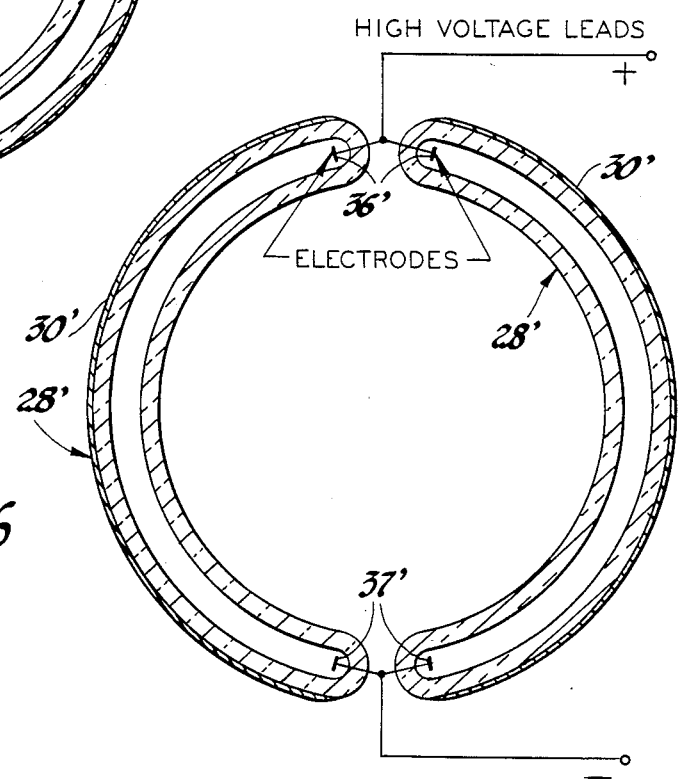
FIG. 6 is a plan view of a modified form of divided toroidal lamp suitable for use with the invention.

FIGS. 5 and 6 show two possible forms of toroidal lamp 28, 28' made of quartz like material thick enough to withstand the high pressures in the engine cylinder. The lamp material is of a grade that will permit transmission of U-V light for wavelengths greater than about 190 nm. The outer surface of the lamp has the reflecting layer 30 which reflects the U-V light into the engine cylinder. The lamp may contain deuterium, xenon, or other suitable gas and possibly chemical additives whose line spectra appear in FIG. 1. FIG. 5 shows a toroidal lamp 28 with electrodes 36, 37 provided at a single break in the toroid shape. For electrical or structural purposes or for purposes of lamp design, it may be desirable to split the toroid into two semicircular segments as indicated in FIG. 6. Further subdivisions are also possible.

Figure 7:
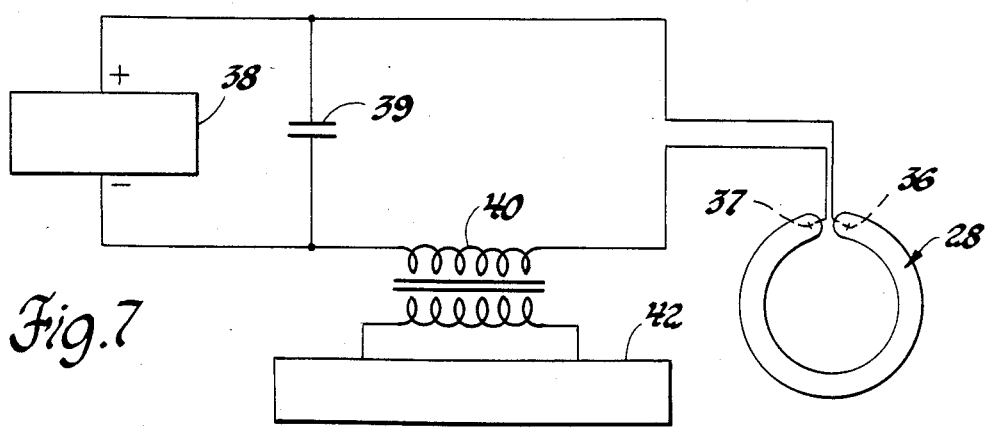
FIG. 7 is a schematic representation of an electric system for actuating a radiation lamp in accordance with the invention.
Figure 8:
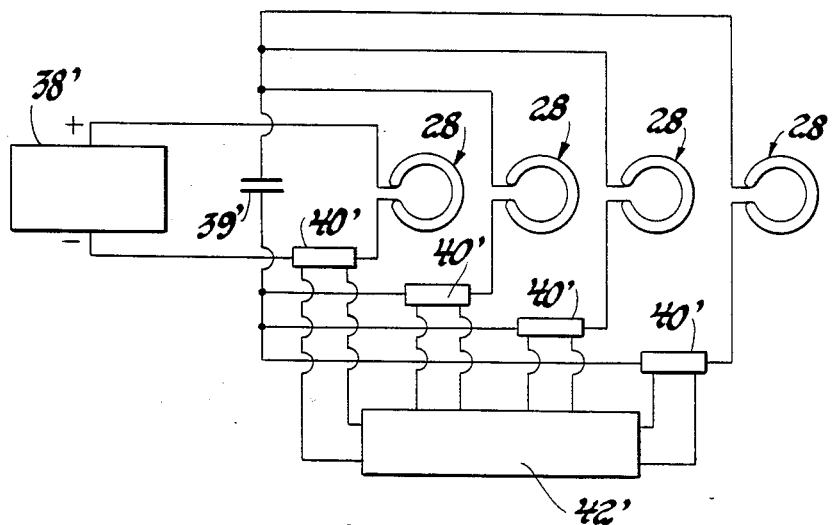
FIG. 8 is a schematic representation of an electric power system for operating the individual cylinder lamps of a multiple cylinder engine.

FIG. 7 shows an example of an electrical circuit that might be used for generating an electrical discharge through the toroidal lamp in FIG. 5. Other circuits or methods could also be used. In the case given, a power supply 38 generates a DC potential which energizes the capacitor 39. Electrical energy from the capacitor is discharged through the toroidal lamp 28 when a suitable ionizing potential is generated by a trigger transformer 40. The transformer receives a signal from triggering and timing circuitry 42 to generate an ionizing potential immediately after the firing of the plasma jet igniter has been initiated and starts to create a strong ignition core in the air-fuel mixture at the center of the cylinder. FIG. 8 shows a similar circuit which would generate sequentially discharges in four toroidal lamps such as might be used with a four cylinder engine. Components similar to those of FIG. 7 are identified by primed reference numerals of equivalent numerical value.

The triggering and timing circuitry may also control the firing of the plasma jet igniter which is discharged in a manner similar to that just described for the toroidal lamp. The plasma jet ignition system preferably has a separate power supply. The plasma jet igniter may be chosen from devices well known in the art. The triggering and timing circuitry may also be developed from known art, ranging from conventional automobile distributors and ignition coil systems to on board computer systems. Essentially this timing system should reference the camshaft speed as input and time the firing of the plasma jet igniter and the flashing of the U-V lamp to occur at the appropriate time in operation of each cylinder of the engine. The duration and pulse form of the discharge through the lamp and the plasma jet igniter may also be controlled by circuitry that is within known art.

The embodiment heretofore described represents a reciprocating piston spark ignition (or separate ignition) engine. However, the absorption front method of stimulating combustion can also be applied to other engine types, for example, a rotary spark ignition engine.

Figure 9:
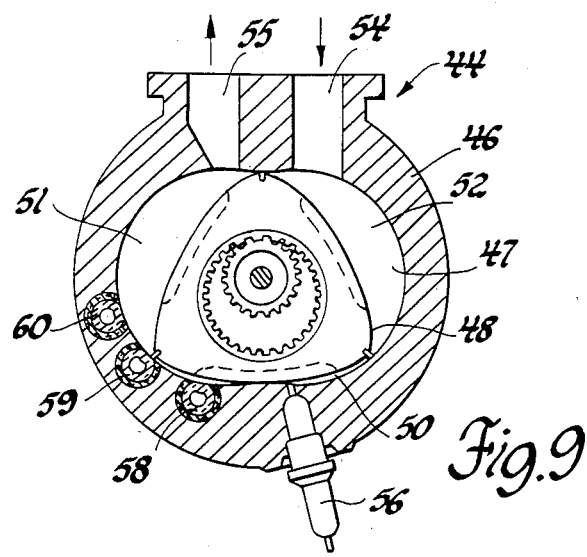
FIG. 9 is a cross-sectional view of a rotary piston internal combustion engine having means in accordance with the invention, and showing one of the combustion chambers near the point of ignition.
Figure 10:
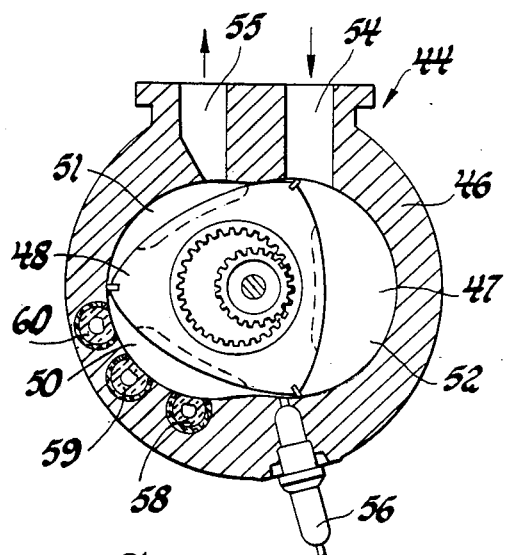
FIG. 10 is a view similar to FIG. 9 but showing a subsequent stage of combustion in one of the combustion chambers.

One embodiment of such an engine is shown, for example, in FIGS. 9 and 10 in which the rotary engine is generally indicated by numeral 44. This engine is provided with a housing 46 defining an internal cavity 47. An eccentrically rotating triangular piston 48 defines within the cavity three combustion chambers 50, 51, 52 which are intermittently communicated with intake and exhaust ports 54, 55, respectively. A plasma jet igniter 56 communicates with the cavity near the top dead center position of the combustion chambers as they rotate around the cavity during movement of the piston. In the portion of the cavity wall which is traversed by each of the combustion chambers during the combustion portion of the chamber cycle, there are mounted a series of three annularly spaced transversely extending ultraviolet lamps 58, 59 and 60 connected for sequential operation.

In operation, a lean fuel-air mixture is drawn into the cavity and compressed by rotation of the piston to the top dead center position indicated with respect to combustion chamber 50 in FIG. 9. Here the plasma jet igniter is fired and the initial U-V lamp 58 is triggered to stimulate combustion in the flame front developed in the burning mixture. As the piston rotates, the working combustion chamber 50 expands, as shown in FIG. 10, and the combustion moves through the mixture in the direction of piston rotation. As this occurs, the second and third U-V lamps 59 and 60 are sequentially triggered to continue to radiate ultraviolet stimulating radiation through the unburned portion of the charge into the advancing flame front until combustion is complete.

Figure 11:
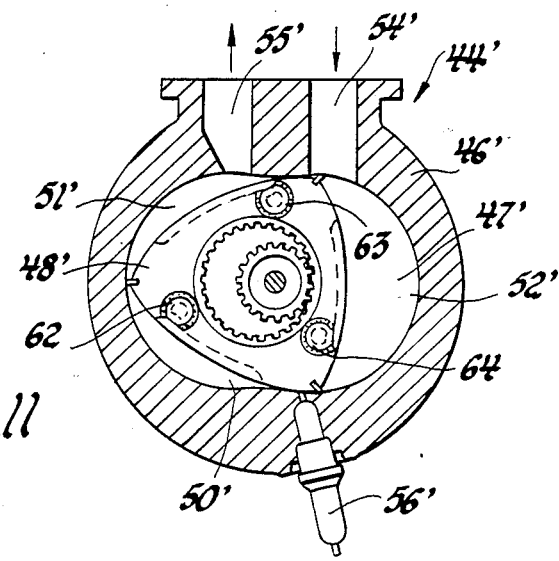
FIG. 11 is a cross-sectional view similar to FIG. 10 but showing an alternate form of construction for application of the invention in a rotary piston engine.

In FIG. 11, an alternative arrangement for applying ultraviolet lamps to a rotary piston engine is shown in which components corresponding to the embodiment of FIGS. 9 and 10 are indicated by primed numerals. In the FIG. 11 embodiment, the U-V lamps 62, 63, 64 are located in the three faces of the piston rather than in the engine housing. In operation the lamps are fired sequentially during the combustion periods of each of their respective combustion chambers.

While the invention has been described by reference to various selected embodiments, and operating methods chosen for purposes of explanation, it should be understood that numerous variations and modifications could be made in the applications, embodiments and methods described without departing from the scope of the inventive concepts disclosed. Accordingly, it is intended that the invention not be limited by the disclosed embodiments but that it have the full scope permitted by the language of the following claims.

The embodiments of the invention in which an exclusive property or privilege is claimed are defined as follows:

1. A method for combustion of air-fuel mixtures, said method comprising the steps of:
   providing and compressing a combustible air-fuel mixture in a closed combustion chamber;
   igniting the air-fuel mixture at an ignition point to establish a flame front of burning mixture, said flame front dividing the combustion chamber into a burned zone containing relatively high temperature combustion products and an unburned zone containing an unburned charge of significantly lower temperature; and
   stimulating combustion in the flame front by directing thereon from the unburned zone ultraviolet radiation primarily consisting of wavelengths exceeding 190 nm which largely pass through the cooler charge in the unburned zone and are absorbed by higher temperature oxygen molecules in the flame front to disassociate the molecules to oxygen atoms that directly stimulate the combustion process as it proceeds.

2. A method for combustion of lean air-fuel mixtures in an internal combustion engine, said method comprising the steps of:
   providing and compressing a lean combustible air-fuel mixture in a closed combustion chamber of such engine;
   igniting the lean air-fuel mixture at an ignition point with high intensity ignition means capable of initiating high temperature burning of the lean air-fuel mixture to establish a flame front of turbulent burning mixture moving toward a distal completion line in the combustion chamber, said flame front dividing the chamber into burned and unburned zones, the burned zone containing relatively high temperature combustion products and the unburned zone containing an unburned charge of significantly lower temperature; and
   stimulating combustion in the flame front by directing thereon from the unburned zone ultraviolet radiation consisting primarily of wavelengths exceeding 190 nm which largely pass through the relatively cool charge in the unburned zone and are absorbed by higher temperature oxygen molecules in the flame front to disassociate the molecules to oxygen atoms that directly stimulate the combustion process as it proceeds.

3. A method for combustion of air-fuel mixtures, said method comprising the steps of:
   providing and compressing a combustible air-fuel mixture in a closed combustion chamber;
   causing ignition of the air-fuel mixture to establish a flame of burning mixture in at least one part of the combustion chamber moving from a burned zone containing relatively high temperature combustion products toward an unburned zone containing unreacted gas of significantly lower temperature, and
   stimulating combustion in the flame by directing thereon ultraviolet radiation primarily consisting of wavelengths exceeding 190 nm which largely pass through the cooler charge in the unburned zone and are absorbed by higher temperature molecules in the flame to disassociate said molecules to more active particles that directly stimulate the combustion process as it proceeds.

* * * * *